July 1, 1969   G. E. EDLING   3,453,176
MEANS FOR CONDENSING STEAM LIBERATED WITHIN A CLOSED SPACE
Filed April 13, 1966

INVENTOR.
GUSTAF EMANUEL EDLING
BY
Bailey, Stephens + Huettig
ATTORNEYS

July 1, 1969 G. E. EDLING 3,453,176
MEANS FOR CONDENSING STEAM LIBERATED WITHIN A CLOSED SPACE
Filed April 13, 1966 Sheet 2 of 2
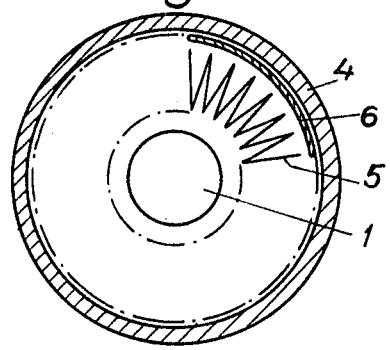
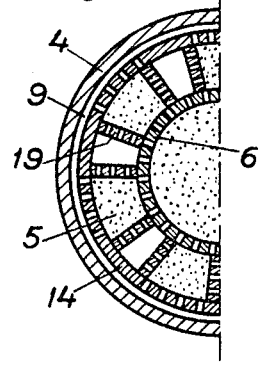
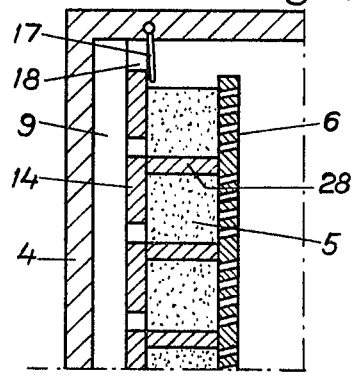
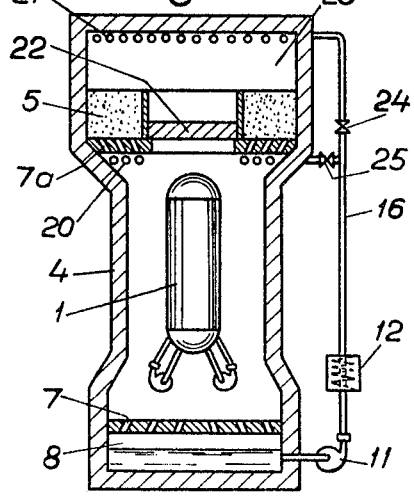
INVENTOR.
GUSTAF EMANUEL EDLING
BY
Bailey, Stephens & Huettig
ATTORNEYS ns patent office 3,453,176
Patented July 1, 1969

3,453,176
MEANS FOR CONDENSING STEAM LIBERATED WITHIN A CLOSED SPACE
Gustaf Emanuel Edling, Stockholm, Sweden, assignor to Allmänna Svenska Elektriska Aktiebolaget, Vasteras, Sweden, a Swedish corporation
Filed Apr. 13, 1966, Ser. No. 542,384
Claims priority, application Sweden, Apr. 13, 1965, 4,842/65
Int. Cl. G21c 19/20, 19/32
U.S. Cl. 176—37      6 Claims

ABSTRACT OF THE DISCLOSURE

A pressure suppression system of nuclear reactor plants having the complete reactor with accessories enclosed in a tight enclosure. Inside this enclosure are arranged stationary heat-absorbing and heat-accumulating solid bodies having large contact surface, for instance macadam or turning chips, which serves as a condensing surface in case of a brust in a water and/or steam containing part of the reactor or its accessories.

---

Figure 1:
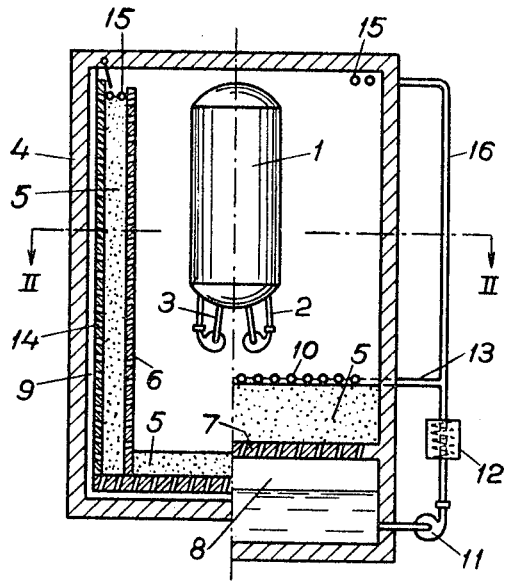

In a vessel with water and/or steam under high pressure and high temperature energy is stored which is suddenly liberated if the vessel or its connections burst. If at the same time substances are also liberated which are dangerous for the surroundings steps must be taken to ensure that spreading to the surroundings is prevented.

This problem may arise with different types of arrangements and, as an example, may be mentioned atomic reactor plants.

In order to prevent serious consequences of an accident of the type mentioned here, the space in which the equipment likely to cause accidents is placed is usually enclosed in a tight enclosure.

For example a steel sphere has been used which surrounds the installation. This must be dimensioned for the pressure which arises if the energy stored in the enclosed system is liberated. The pressure may afterwards be reduced, for example by spraying the space with water. The pressure for which the enclosure must be dimensioned is high and the necessary enclosure expensive.

A sphere of this type is difficult to manufacture with such accuracy that the construction is completely tight and it is difficult to verify that it has maintained its tightness and strength during continued use of the installation.

Another arrangement is so constructed by arranging a water basin within the tight enclosure, into which basin the liberated steam is blown and condenses. In this way it is intended that the pressure arising inside the containment when an accident occurs will be limited and that it will be rapidly reduced through steam condensation in the water. If in this arrangement the enclosure is made as a circular concrete building, the walls will be very thick since it is, after all, a question of high pressure. Usually a construction with pre-stressed concrete must be used.

This arrangement requires considerable space and it is also expensive, since also in this case the enclosure must be dimensioned for a high pressure. Due to the way it operates, the arrangement must be so constructed that the liberated steam is carried through ducts to the condensing chamber and is there distributed in distribution chambers provided with discharge tubes for distribution of the steam in the water. This flowing and transport of steam—and any air in the installation—requires pressure which, as already mentioned, means that the enclosure must be dimensioned for a high pressure, i.e. several atmospheres. This means, among other things, that the pressure within the enclosure when an accident occurs will be high and that it will be different in different chambers due to great flow resistance in the channels, distribution chambers and. the blow-out tubes which distribute the steam and air into the water.

It is doubtful whether the installation would function in the intended manner upon a suddenly occurring accident. Among other things it is assumed that the connection ducts between the space where the steam is liberated and the condensing chamber are able to withstand the rapid temperature and pressure increase and also that, in spit of the sudden rush of steam when it flows into the water, the condensation will be almost total. Further, it must be pre-supposed that the enclosure where the high pressure and usually also high temperature suddenly arise can also function in the intended manner without being damaged.

The object of the present invention is to solve the discussed problems in a simpler and less expensive manner than the known art and this takes place without the complications associated with known arrangements.

The arrangement is characterised in that the condensation of the seam liberated upon an accident takes place almost instantaneously on the surfaces of solid bodies and without the steam and air being first carried to the condensation chamber through pipes and channels requiring a pressure drop. According to the invention a condensing and heat-accumulating mass is arranged within the tight enclosure. When this is correctly arranged and dimensioned, the condensation takes place almost simultaneously with the liberation of energy and no high pressure can arise.

The heat-accumulating and cooling mass is suitably placed so that it completely or partly surrounds the space in which the sudden outflow of steam occurs (walls, ceiling, floor).

If desired the heat-accumulating mass may be placed as a layer inside the enclosure.

According to the present invention the cooling and condensing mass is arranged within the enclosure, either in a few, very large surfaces or in several small surfaces having together a large cooling surface.

Before pressure can arise within the enclosure, at least the main part of the enclosed space must be filled with steam. Since all, or most, of the steam must flow through the cooling and heat-accumulating mass, no troublesome pressure can arise. The walls of the enclosure are protected against rapid temperature increase since the pressure never becomes high and, if desired, the mass can be arranged so that any loose particles flying around in an accident do not damage the enclosure.

Since, in comparison with known systems, the pressure is extremely low, the wall may be made of concrete without prestress or of steel (sphere or cylinder).

Since it is here a question of rapid action, it is necessary for the mass to be able in a short time to absorb a great amount of heat.

The accumulating capacity is of course chosen with regard to the amount of heat which must be absorbed.

So that the heat absorption can take place quickly, the product of the mass surface and the heat-transmission capacity must be high. The heat transmission from the steam to the mass is determined by the heat transmission coefficient, $\alpha$, coefficient of thermal conductivity, $\lambda$, temperature difference and size of the surface.

Since it is here a question of heat emission from condensing steam, the $\alpha$ value will be high.

Which values apply to a particular installation depends of course entirely on the mass chosen and the size of the mass elements and other properties.

Stone may be used, or metals, for example in the form of turning chips, ore and other materials which have been given suitable element size with regard to the desired surface. In passing it is pointed out that if suitable material is used and it is suitably placed a convenient increase in protection against radiation is obtained for the surrounding area. The walls of the enclosure will then be thinner and cheaper.

The cooling surface may consist of closed cooling elements containing liquid for accumulating or carrying away the heat.

The liquid may be stationary or in circulation, either continuously, intermittently or when an accident occurs. Economic reasons and local conditions determine the kind of mass to be used.

The cooling mass is suitably arranged so that there is a suitable volume in the installation for any displaced air and for collecting the condensate formed upon condensation.

If it is considered suitable, during normal operation the cooling mass may be protected against dust and the like by using a casing of, for example, plastic, which bursts at negligible over-pressure.

It is suitable to arrange for the cooling mass to be completely or partly sprinkled with water. In principle it is possible to maintain a permanent water spray on the cooling mass. This would provide certain simplifications and the necessary cooling surface would be smaller.

As a rule, however, it is preferable to use water-spraying only on special occasions and normally keep the mass dry.

If after an accident—when the installation according to the invention has functioned as outlined above—the accumulated heat is to be removed, the simplest method is water-spraying.

It is usually suitable to use circulating water for this, which can be indirectly cooled in known manner. In this way all the accumulated heat can be removed and the air in the space is also dried since it transmits its moisture to the colder mass.

The principles of the invention are best illustrated with reference to accompanying drawings.

Figure 2:
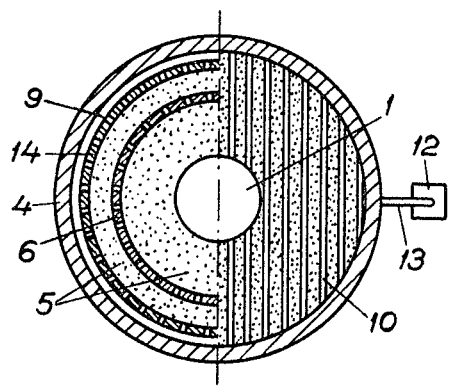

FIGURE 1 shows a reactor plant in vertical section and FIGURE 2 is a section along the line II—II in FIGURE 1. FIGURE 3 shows in horizontal section an embodiment where the cooling surface consists of cooling elements. FIGURE 4 shows in vertical section an alternative arrangement of the cooling mass and FIGURE 5 is a horizontal section with another arrangement of the cooling mass. FIGURE 6 shows a modified reactor plant in vertical section.

In the embodiment shown in FIGURES 1 and 2, 1 designates a reactor and 2 and 3 designate pipes for water and steam. The reactor is surrounded by a tight enclosure 4. In the right-hand part of FIGURE 1 there is a cooling layer 5 in the form of macadam applied on a perforated bottom 7. Under the bottom 7 is a space 8 where, among other things, condensate and air can be collected (this space may contain water permanently). Above the cooling layer 5 are situated distribution tubes 10 for sprinkling water. By means of a pump 11, heat exchanger 12 and tubes 13, the space 8 is connected to the distribution tubes 10 for circulation of the sprinkling liquid.

As is clear from the left half of FIGURE 1, the cooling and heat-accumulating layer 5 is also applied along the walls of the enclosure 4 with the help of an inner support 6 and an outer support 14, both of which permit through-flow of steam to an air space 9 between the mass and the outer enclosure. 15 designates sprinkling tubes for water which are connected to the pump 11 by means of pipes 16.

In FIGURE 3 another arrangement is shown. Here 1 desingates the reactor, 4 is the tight enclosure, 5 and 6 are parts of a solid heat-exchange surface. It may, for example, be constructed as a plate heat-exchanger (as indicated) or comprise tubes or other arrangements containing liquid for the removal of heat.

For such removal pumps, pipes and possibly a heat-exchanger (if the liquid is to circulate) are used in known manner.

FIGURES 4 and 5 show examples of alternative arrangements of the cooling material.

If it is desired to increase the surface for the inflow of steam in the cooling material, this may be done, for example, as shown in these figures. In FIGURE 4, 4 designates the enclosure, 5 the cooling mass, 6 the inner support for this material, 14 the outer support for this material, 9 a space for, for example air and gases, while 28 is a supporting floor element.

The supports 6 and 14 are intended to support the cooling mass but offer such large through-flow openings for steam and air that no appreciable flow resistance arises.

In the embodiment shown in FIGURE 4 a flap valve 17 is arranged in such a way that it prevents flow into the intermediate space 9 through an opening 18 in the support 14.

In FIGURE 5, 4 designates an enclosure surrounding the reactor, 9 an intermediate space, 6 an inner and 14 an outer support for the cooling mass. Between the supports 6 and 14 are arranged vertical, perforated screens 19. In the outer support 14 perforations are arranged so that steam cannot flow directly out into the intermediate space 9, but is instead forced through the cooling mass 5.

The use of a cooling and heat-accumulating mass within the tight enclosure also means that the cooling can be arranged completely or partly in the upper part of the enclosure. This is better illustrated in FIGURE 6. With this arrangement, the water liberated upon an accident will flow downwards while the stream flows upwards. The water is collected in a space designed for this purpose. When the steam condenses in the cooling mass, the condensate which forms will run downwards and in counter-flow to the steam. If, due to the great capacity of the cooling mass, the condensate has become undercooled, it will be warmed again by contact with the steam in the counter-flow. In this way an increased cooling effect can be achieved and the cooling mass will be effectively utilized. The condensate will to a certain extent have the same effect as spraying. This effect is increased when the water is pumped to the spraying tubes 20 and 21.

In FIGURE 6, 4 is the tight enclosure. 1 is tthe reactor. 7 is a bottom consisting of beams which is perforated to allow water through to the space 8. The perforated beam bottom 7a supports the cooling mass 5. Air which is displaced by the steam can be collected in the spaces 8 and 23. In a manner previously described the space and cooling mass can be sprayed with water with the help of the pump 11, pipe 16—with the cooler 12—to the distribution tubes 21 in the upper space and/or tubes 20 below the cooling mass. The spraying is directed to the desired area through valves 24 and 25 or in some other suitable manner. 22 indicates a lid for admission to the upper part of the reactor 1. In the space 23 a lifting device may suitably be arranged.

The arrangement functions in the following manner:

If, for example, the pipes 2 or 3 burst, the steam flows out in the mass 5. This is cold in comparison with the steam and condensation occurs almost as quickly as the steam flows in.

The air already in the space need not be taken away to another space, but if this is done the air may, for example, be collected in the spaces 8 and 9.

Merely to indicate conditions in practice, some figures will be mentioned here as examples. The surface of a cube having edges of one metre in length is 6 m.$^2$. If this solid mass is divided into cubes having edges 5 mm. long, the total outer surface of the same solid mass will be 200 times greater. If a space measuring 1 m.$^3$ is filled with half this quantity, therefore, a heat-absorbing surface of 600 m.$^2$ per m.$^3$ of the space is achieved. In practice a total space of, for example, 2500 m.$^3$ may be involved. Thus, in the example mentioned a total surface of, for example, 1,500,000 m.$^2$. If stone material is chosen, with a temperature increase of only 50° C. this amount can absorb the heat of about 80 tons of steam, which is quite sufficient even with very large installations, and condensation of all the steam can take place, depending on the dimensioning, in 5 to 10 seconds.

As will be clear from the above, the arrangement according to the invention is characterised in that the steam which is liberated in the space comes into contact with cooling and condensing surfaces within the tight enclosure without being first carried through channels (pipes) and walls to another limited space within an enclosure. The pressure within the enclosure increases very little and within the various spaces of the enclosure the pressure will be almost the same since the only pressure difference arises from flow in the cooling mass.

It is, however, not at all necessary for the cooling mass to be located in such a manner. Depending entirely on the dimensions and arrangement, the cooling mass may be arranged as desired only on some of the walls or also in the floor or only in the floor, which latter alternative is probably in practice the most attractive with respect to efficiency and cost.

The advantages of the invention are, among others, as follows:

Since the cooling surface is situated in the same space as where the steam generation takes place, condensation takes place very rapidly without being delayed by transfer to another area and without there being time for a high pressure to develop. This also means that the cooling mass protects the walls of the enclosure against temperature shock in connection with an accident. If a concrete construction is used this temperature protection is very valuable.

The cooling mass may be chosen of cheap material having unlimited durability.

The enclosure will be cheap since the construction is designed for low pressure.

If the cooling mass is suitably arranged it can protect the walls of the enclosure from the impact of fragments upon an accident.

The condensate is not contaminated by, for example, cooling water. This is important if the system operates with heavy water.

The cooling mass may be chosen of such a quality and arranged in such a way that it also provides radiation protection and in this way the demands on the function of the enclosure walls are reduced in this respect. This means a considerable saving.

The arrangement according to the invention functions absolutely reliably. With equipment operating with condensation of water, the operation, of course, depends on the fact that water is always available.

The proposed arrangement functions entirely reliably even if the foundations should be damaged by some sort of abnormal strain, earthquake, bombing or the like. One advantage of the arrangement is that a free choice of different types of materials and arrangements is possible. It is easy by means of simple experiments to vertify calculations or obtain basic technical values for such calculations.

I claim:

1. In combination witth a device forming a closed space, means capable of liberating steam suddenly within said closed space and means for condensing said liberated steam within said closed space, said means for condensing liberated steam comprising stationary heat-absorbing and heat-accumulating solid bodies positioned in said space, said bodies having large contact surfaces and said device having cooling means to keep said bodies at a temperature significantly lower than that of said steam at least before said liberation of steam.

2. A device according to claim 1, said bodies being arranged to surround at least partly the space where said steam is liberated.

3. A device according to claim 1, said bodies comprising a multitude of separate elements.

4. A device according to claim 1, said bodies comprising a stone material.

5. A device according to claim 1, said cooling means including means to spray cooling water over said solid bodies.

6. A device according to claim 1, said means capable of liberating steam suddenly comprising a nuclear reactor and accessories for said nuclear reactor.

References Cited

UNITED STATES PATENTS

| | | | |
|---|---|---|---|
| 2,153,644 | 4/1939 | Schierenbeck | 165—1 XR |
| 2,580,635 | 1/1952 | Winter | 165—1 XR |
| 2,913,883 | 11/1959 | Burgess | 34—75 XR |
| 3,070,535 | 12/1962 | Spooner | 176—38 |

FOREIGN PATENTS

| | | |
|---|---|---|
| 1,303,680 | 8/1962 | France. |

ROBERT A. O'LEARY, *Primary Examiner.*

MANUEL A. ANTONAKAS, *Assistant Examiner.*

U.S. Cl. X.R.

163—8; 165—134